US010982989B2

(12) United States Patent
Schmits et al.

(10) Patent No.: US 10,982,989 B2
(45) Date of Patent: Apr. 20, 2021

(54) FILL LEVEL MEASURING DEVICE

(71) Applicant: KROHNE Messtechnik GmbH, Duisburg (DE)

(72) Inventors: Christoph Schmits, Dortmund (DE); Matthias Linkies, Mülheim (DE); Charalambos Ouzounis, Bochum (DE); Christian Schulz, Bochum (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 263 days.

(21) Appl. No.: 16/247,737

(22) Filed: Jan. 15, 2019

(65) Prior Publication Data

US 2019/0219436 A1 Jul. 18, 2019

(30) Foreign Application Priority Data

Jan. 16, 2018 (DE) .................... 10 2018 100 845.7

(51) Int. Cl.
| | | |
|---|---|---|
| *G01F 23/284* | (2006.01) | |
| *G01F 23/00* | (2006.01) | |
| *H01Q 1/22* | (2006.01) | |
| *G01S 13/88* | (2006.01) | |
| *H01Q 1/36* | (2006.01) | |
| *H01Q 1/50* | (2006.01) | |
| *H01Q 1/52* | (2006.01) | |
| *H01Q 21/28* | (2006.01) | |
| *G01S 13/00* | (2006.01) | |

(52) U.S. Cl.
CPC ........ *G01F 23/284* (2013.01); *G01F 23/0061* (2013.01); *H01Q 1/225* (2013.01); *G01S 13/88* (2013.01)

(58) Field of Classification Search
None
See application file for complete search history.

(56) References Cited

U.S. PATENT DOCUMENTS

| | | | | |
|---|---|---|---|---|
| 4,205,315 A | * | 5/1980 | Fleenor ................. | G01F 23/284 342/124 |
| 4,345,257 A | | 8/1982 | Brunner | |
| 4,376,937 A | * | 3/1983 | Cohen ................... | H01Q 25/02 342/43 |

(Continued)

FOREIGN PATENT DOCUMENTS

| | | |
|---|---|---|
| DE | 102007057211 A1 | 5/2009 |
| DE | 102010027962 A1 | 10/2011 |
| DE | 102016108594 B3 | 11/2017 |

*Primary Examiner* — Bernarr E Gregory
(74) *Attorney, Agent, or Firm* — David S. Safran; Roberts Calderon Safran & Cole, P.C.

(57) ABSTRACT

A fill level measuring device having at least one transmitting and receiving unit, a measuring antenna with a first supply element for transmitting and receiving an electromagnetic measurement signal and at least one dielectric body for guiding and/or shaping the waves of the measurement signal, and a communication antenna. The communication antenna has at least one second supply element for wireless transmission and for receiving an electromagnetic communication signal. To provide a fill level measuring device that can be used particularly flexibly, the first supply element and the second supply element are arranged inside the dielectric body so that the dielectric body is able to guide and/or shape the measurement signal and the communication signal.

9 Claims, 6 Drawing Sheets

(56) References Cited

U.S. PATENT DOCUMENTS

| | | |
|---|---|---|
| 8,917,215 B2 | 12/2014 | Pohl |
| 9,091,753 B2 | 7/2015 | Deilmann et al. |
| 9,163,974 B1 | 10/2015 | Kekäläinen |
| 9,677,922 B2 | 6/2017 | Skowaisa |
| 2008/0278145 A1* | 11/2008 | Wenger .................. H04Q 9/00 |
| | | 324/157 |
| 2009/0027200 A1 | 1/2009 | Herbert et al. |
| 2010/0141505 A1* | 6/2010 | Bergmann ............ G01F 23/284 |
| | | 342/124 |
| 2015/0377680 A1 | 12/2015 | Edvardsson et al. |
| 2016/0103006 A1* | 4/2016 | Edvardsson ............ G01S 13/88 |
| | | 342/124 |
| 2017/0219407 A1* | 8/2017 | Kutil .................. G01F 23/284 |
| 2018/0003650 A1* | 1/2018 | Uchida .................. G01S 13/88 |
| 2018/0010949 A1 | 1/2018 | Ohlsson et al. |

\* cited by examiner

FILL LEVEL MEASURING DEVICE

BACKGROUND OF THE INVENTION

Field of the Invention

The invention is based on a fill level measuring device having at least one transmitting and receiving unit comprising a measuring antenna, wherein the measuring antenna has a first supply element for transmitting and receiving an electromagnetic measurement signal and at least one dielectric body for guiding and/or forming the waves of the measurement signal, and a communication antenna, wherein the communication antenna has at least one second supply element for transmitting and receiving an electromagnetic communication signal.

Description of Related Art

Fill level measuring devices which are based on a radar method and communicate via a wireless connection, for example with central control units, are known from the prior art.

A device is known from the German Patent Application DE 10 2007 057 211 A1 for detecting the fill level of a container which can be closed with a fastener, wherein the fill level sensor, the power supply, the evaluation unit and the transmitting unit are encapsulated in the fastener. The transmitting unit is preferably designed as a radio, IR, GSM and/or WLAN transmitter.

A radar antenna with integrated IFF antenna is known from German Patent DE 29 25 063 and corresponding U.S. Pat. No. 4,345,257.

German Patent Application DE 10 2010 027 962 A1 concerns a wirelessly communicating fill level measuring device comprising a communication antenna and a separate measurement antenna to be aligned with the product to be measured.

An apparatus for determining the flow velocity and the fill level of a medium based on a radar method, wherein the antenna arrangement comprises a first antenna for radiating an FMCW transmission signal in a first direction and a second antenna for radiating a CW transmission signal in a second direction is known from European Patent Application EP 2 824 433 A1 and corresponding U.S. Pat. No. 9,677,922.

The problem with fill level measuring devices known from the prior art is that, in order to implement wireless communication with the measuring device, the communication signal must be decoupled via a suitable transmitting unit. However, such a transmitting unit is always another weak point of the measuring device, since every mechanical connection with the measuring device also requires additional sealing surfaces. In this respect, such measuring devices often do not meet the requirements of higher IP classes with regard to watertight design.

SUMMARY OF THE INVENTION

Based on the prior art described above, the object of the invention is to provide a fill level measuring device that is particularly simple in design and can be used flexibly at the same time.

According to a first teaching, the above-mentioned object is achieved by a fill level measuring device of the type described initially above, in which the first supply element and the second supply element are arranged within the dielectric body, so that the dielectric body is designed to guide and/or shape the measurement signal and the communication signal.

In accordance with the invention, it was recognized that the body for guiding and/or shaping the waves of the measuring antenna can also be used to guide another electromagnetic communication signal, so that as a result a single dielectric body can be used to transmit two different electromagnetic signals. On the one hand, it is thus possible to communicate wirelessly with the fill level measuring device in an advantageous way, and on the other hand, it is possible to dispense with the need of providing further transmitting elements, which in turn entail further sealing surfaces, for decoupling the wireless communication signal.

This makes the fill level measuring device according to the invention particularly simple to design and also meets the requirements of higher IP classes with regard to a watertight design, as it only has one sealing surface between the measuring antenna and the electronics housing, so that it is also particularly suitable for identifying fluid media.

According to an advantageous design, the geometric shape and the direction of radiation of the second supply element is adapted to the material and the shape of the dielectric body in such a way that both the measurement signal and the communication signal can be optimally decoupled from the dielectric body.

For example, the measuring antenna can be designed as a drop antenna, wherein the first supply element and the second supply element are arranged inside the drop-shaped dielectric body. However, the dielectric body may have any other suitable shape. For example, the dielectric body may be round or semi-ellipsoidal.

In addition, the dielectric body can be designed with one or more parts. For example, a multi-part design has at least two geometrically different parts, but the dielectric body as a whole is made of one workpiece. According to one design, a first part of the dielectric body is designed to decouple the communication signal, and a second part of the dielectric body is designed as a lens body to guide and decouple the measurement signal.

The dielectric body is preferably made of plastic, such as Polypropylene (PP), Polytetrafluoroethylene (PTFE) or polyetheretherketone (PEEK).

The first supply element of the measuring antenna is designed as a waveguide. Alternatively, the first supply element can also be designed as a horn radiator or as a patch element.

According to a further design, the first supply element is designed as a metallic waveguide or as a metallic horn radiator, wherein the length of the waveguide or horn radiator preferably corresponds essentially to the length of the dielectric body or at least twice or three times the value of the length of the second supply element. This design has the advantage that, due to the length of the waveguide or horn radiator and its material design, shielding effects, which will be described in more detail later, are ensured between the first supply element and the second supply element.

According to a further design, the second supply element is designed as a rod, preferably as a steel pin, or as a glue-on antenna body or as a foil antenna body. The shape of the second supply element, i.e., the antenna body, is adapted to the respective application. For example, the second supply element can be straight, curved or branched.

According to a further design, the second supply element is shorter than the first supply element, preferably by at least a factor of 2.

According to a next design, the first supply element and the second supply element are arranged such that the measurement signal and the communication signal are radiated in different directions. It is particularly advantageous when the angle between the propagation direction of the measurement signal and the propagation direction of the communication signal is approximately 90°.

The angle between the direction of propagation of the measurement signal and the direction of propagation of the communication signal is larger than 90° according to a further design and smaller than 90° according to an alternative design.

According to a further design, the first supply element and the second supply element are arranged in such a way that the measurement signal and the communication signal are radiated at least partially in the same direction. This design is particularly advantageous when the fill level measuring device is used to measure a medium that is not arranged in a closed and conductive vessel.

According to a next design, the communication antenna comprises an electronics unit and the electronics unit and the second supply element of the communication antenna for emitting a communication signal are designed according to one of the following standards: Bluetooth, GPS, GSM, LTE, Zigbee, Z-Wave, IOT standards, Wireless HART, wireless fieldbus standards, WLAN, 5G, UMTS, CDMA.

According to one design, the communication antenna is designed as a network node in a point-to-point connection or in a mesh network.

According to a next design, the fill level measuring device is designed to measure the fill level within a container, wherein at least one mounting element is present, wherein the mounting element causes the second supply element in the mounted state to be at least partially located in the outer area of the container. In this manner, it can be ensured that the communication signal is perceptible outside the container. This is particularly relevant if the container is both closed and conductive. If the container is not completely closed and/or is not made of a conductive material, it is also possible to radiate the communication signal at least partially into the container and couple it out for detection.

The mounting element is preferably designed as a threading and/or flange and/or as a tube-shaped spacer. The threading can, for example, be formed in the dielectric body, wherein the threading can be screwed into a flange or directly into the container wall for connection to the container. Alternatively, or additionally, a flange can be formed, for example, by the dielectric body or be arranged on the dielectric body, wherein the transmitting and receiving unit is connected to the container via the flange in such a manner that the communication antenna is arranged at least partially in the outer region of the container.

Alternatively, or additionally, the mounting element can also be designed as a tube-shaped spacer, wherein the spacer is arranged between the container wall and, for example, the electronics housing of the fill level measuring device in the mounted state. According to a preferred design, the tube-shaped spacer is positively and/or non-positively and/or materially connected to the dielectric body. The tube-shaped spacer is particularly preferably made of plastic and is permeable for the communication signal.

According to another design, a shielding is provided, wherein the shielding is arranged and designed in such a manner that it spatially separates the measurement signal emitted by the first supply element and the communication signal emitted by the second supply element during operation of the fill level measuring device. This design has the advantage that mutual interference between the two signals can essentially be ruled out.

According to a particularly preferred design, the shielding is designed as a metallic shielding element, wherein the metallic shielding element is arranged inside the dielectric body. The metallic shielding element can, for example, be designed as a metallic sheet or as a foil which is at least partially arranged between the propagation direction of the communication signal and the propagation direction of the measurement signal. Alternatively or additionally, the shielding can also be implemented by the length and/or the geometric design of the first supply element. If, for example, the first supply element is designed as a metallic horn radiator whose length essentially corresponds to the length of the dielectric body, the body of the horn radiator has a shielding effect with respect to the communication signal.

According to a further design, at least one second communication antenna is provided, wherein preferably at least one of the two communication antennas is designed as a connection of two networks with different structure or switching technology.

According to a configuration, the second communication antenna has a third feed element, wherein the third feed element is identical to the second feed element or different from the second feed element.

In detail, there are now a number of possibilities for designing and further developing the fill level measuring device according to the invention as will become apparent from the following description of preferred embodiments in conjunction with the drawings.

DETAILED DESCRIPTION OF THE INVENTION

Figure 1:
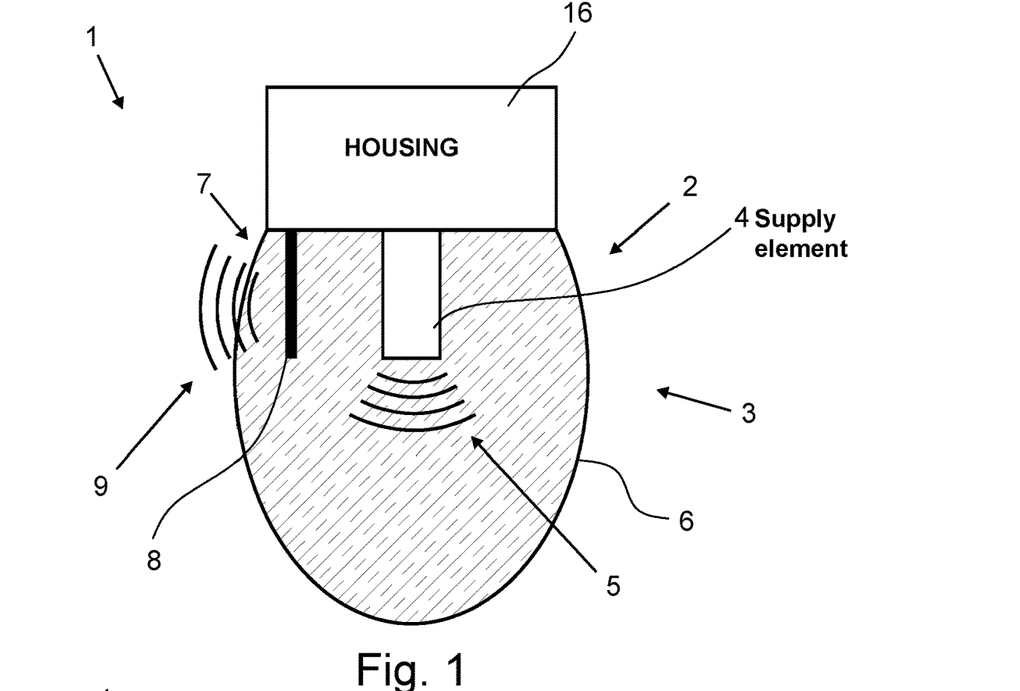
FIG. 1 is a schematic representation of a first embodiment of a fill level measuring device, FIG. 2 schematically shows a second embodiment of a fill level measuring device with a mounting element, FIG. 3 schematically shows a third embodiment of a fill level measuring device with a two-part dielectric body, FIG. 4 schematically shows a fourth embodiment of a fill level measuring device in mounted position with a spacer, FIG. 5 schematically shows a fifth embodiment of a fill level measuring device, also in mounted position with a spacer, FIG. 6 schematically shows a sixth embodiment of a fill level measuring device with a shielding, FIG. 7 schematically shows a seventh embodiment of a fill level measuring device with special suitability for open applications, FIG. 8 schematically shows an eighth embodiment of a fill level measuring device with a spherical dielectric body, FIG. 9 schematically shows a ninth embodiment of a fill level measuring device with a dielectric body in the form of a semi-ellipsoid, FIG. 10 schematically shows a tenth embodiment of a fill level measuring device with horn radiator as supply element, and FIG. 11 schematically shows an eleventh embodiment of a fill level measuring device with a specially matched geometry of the supply elements.

FIG. 1 shows a fill level measuring device 1 having a transmitting and receiving unit 2, wherein the transmitting and receiving unit 2 comprises a measuring antenna 3, wherein the measuring antenna 3 has a first supply element 4 for transmitting and receiving an electromagnetic measurement signal 5 and a dielectric body 6, and wherein a communication antenna 7 is provided that has a second supply element 8 for wireless transmission and for receiving an electromagnetic communication signal 9. The first supply element 4 and the second supply element 8 are arranged within the dielectric body 6 that is configured to guide and/or shape the measurement signal 5 and the communication signal 9.

Wireless communication can be advantageously implemented with the fill level measuring device 1 without introducing additional seals into the fill level measuring device 1 for coupling and decoupling communication signals 9.

In the shown embodiment, the first supply element 4 and the second supply element 8 are designed and arranged such that the direction of propagation of the measurement signal 5 and the direction of propagation of the communication signal 9 form an angle of approximately 90°.

The first supply element 4 is designed as a simple cylindrical waveguide. The communication antenna 7 is designed as a pin antenna with a rod-shaped antenna body, wherein the communication antenna 7 is designed both geometrically and electronically for transmitting a Bluetooth signal with a frequency of approximately 2.4 GHz.

To accommodate the electronics unit of the communication antenna 7 and the electronics unit of the measuring antenna 3, a housing 16 is provided which is mechanically connected to the first supply element 4, the second supply element 8 and the dielectric body 6.

Figure 2:
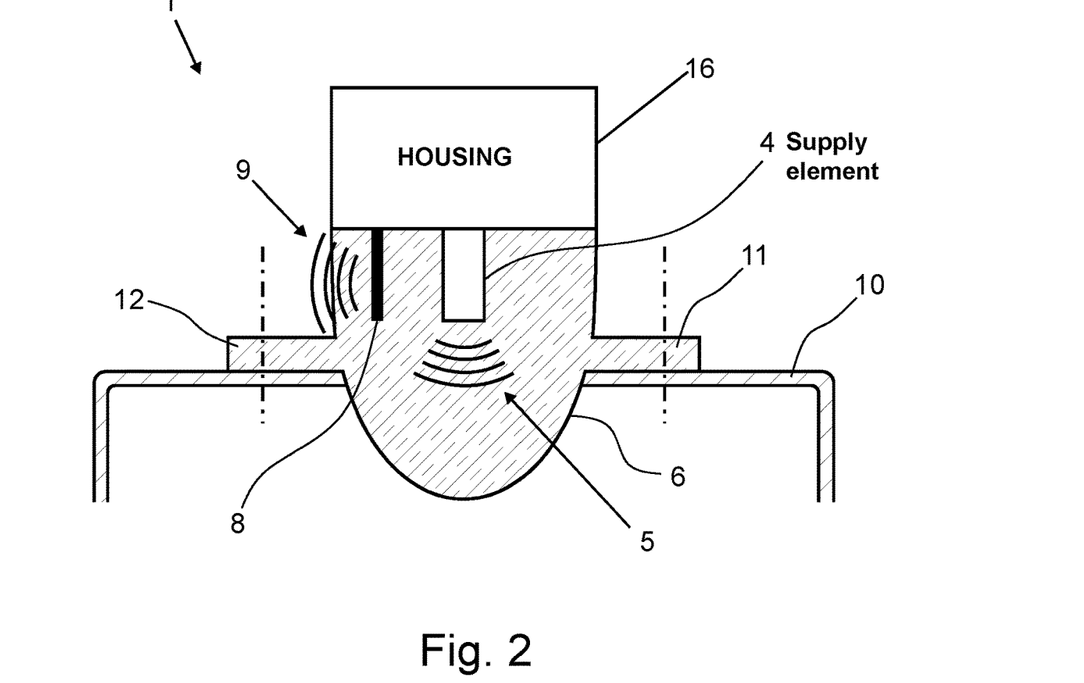

FIG. 2 shows another example of a fill level measuring device 1 designed to measure the level of a medium in a closed container 10. In order to ensure that the communication signal 9 can be detected during operation of the fill level measuring device 1, the shown fill level measuring device 1 has a mounting element 11 in the form of a flange 12 arranged on the dielectric body 6, which causes the second supply element 8 to be arranged outside the container 10 in the mounted state.

Compared to the use of a fill level measuring device 1 with a dielectric measuring antenna known from the prior art, the dielectric body 6 is arranged offset upwards with respect to the upper container wall 10. Since the measurement signal is essentially emitted vertically in the direction of the medium, this vertical offset has no effect on fill level measurement.

This design is particularly advantageous if the container 10 is both closed and conductive.

Figure 3:
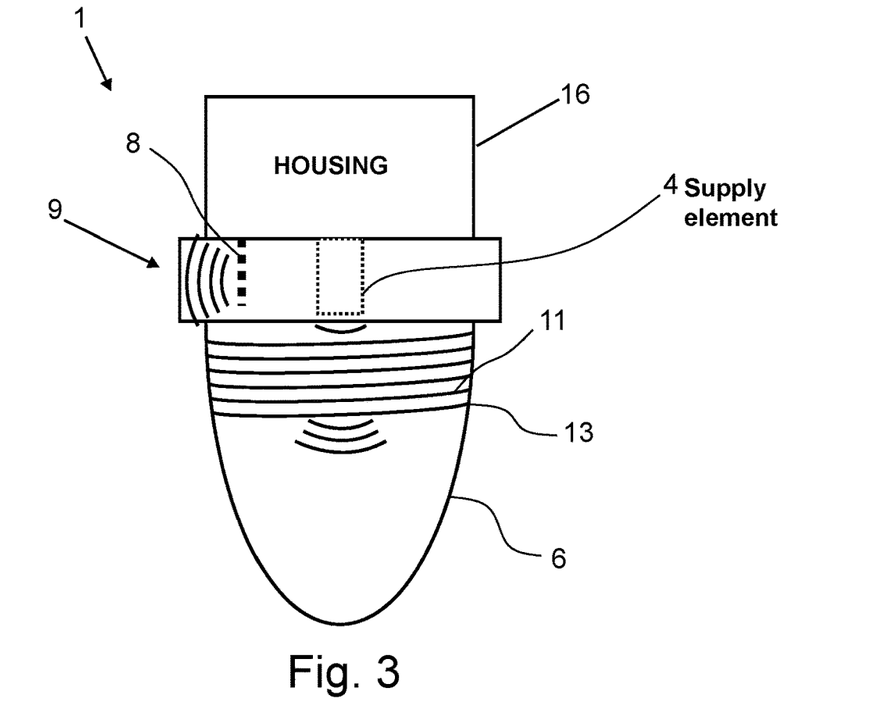

The embodiment of a fill level measuring device 1 shown in FIG. 3 also has a mounting element 11 in the form of a threading 13 introduced into the dielectric body 6, which can be screwed into a flange or into the container wall 10 when mounted. This way it can also be ensured that the second supply element 8 is arranged outside the container 10 in the mounted state.

In addition, the dielectric body 6 shown in FIG. 3 is formed in two parts, wherein the first supply element 4 and the second supply element 8 are arranged in the first, upper part of the dielectric body 6. The first upper part is cylindrical. Via this first part, the communication signal 9 emitted by the second supply element 8 is decoupled. The first supply element 4 radiates the measurement signal 5 into the second, lower part of the dielectric body 6, wherein the lower part is designed as a lens body for shaping and guiding the measurement signal 5. Although the dielectric body 6 in this embodiment is made of two parts, it is made overall of one workpiece.

Figure 4:
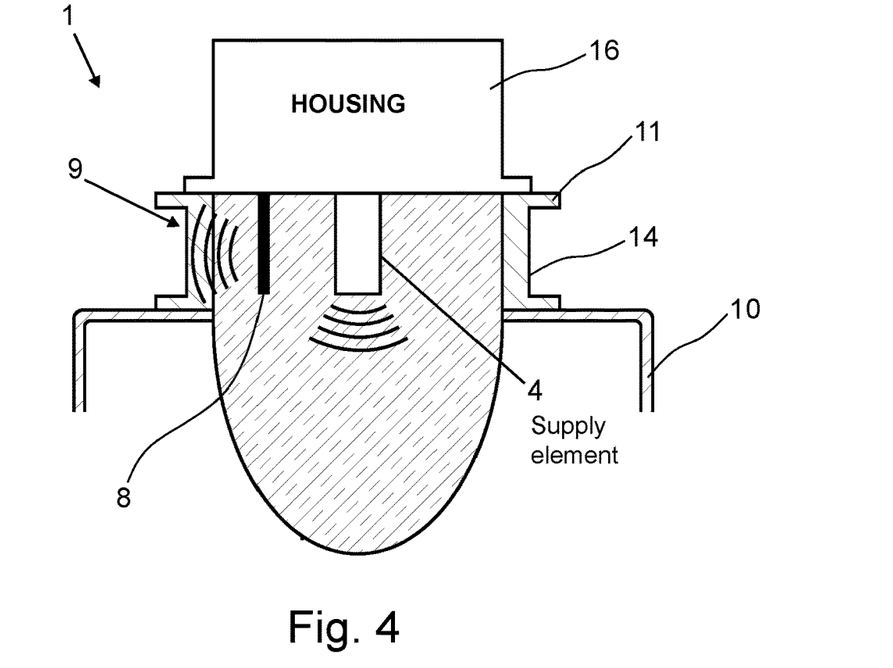

FIG. 4 shows another fill level measuring device 1 which has a mounting element 11 in the form of a tube-shaped spacer 14, wherein the tube-shaped spacer 14 is arranged between the container wall 10 and the housing 16 in the mounted state. In this respect, it is ensured that the second supply element 8 is arranged outside the container 10 in the mounted state. Preferably, the tube-shaped spacer 14 is made of a material permeable to the electromagnetic communication signal 9, wherein the tube-shaped spacer is force fit and form fit to the dielectric body.

Figure 5:
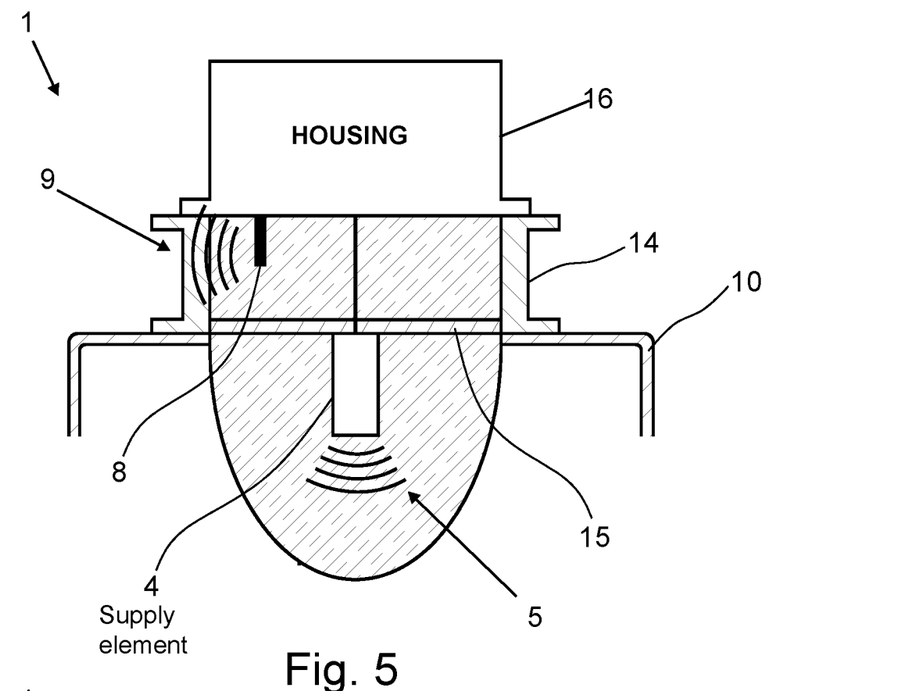

In the embodiment of a fill level measuring device 1 shown in FIG. 5, the first supply element 4 and the second supply element 8 are arranged at different heights within the dielectric body 6. The second supply element is arranged outside the container 10 in such a way that the communication signal 9 is emitted exclusively into the outer area of the container. The first supply element 4 for emitting the measurement signal 5 is arranged lower in the longitudinal direction of the measuring device 1.

In addition, there is a shielding 15 in the form of a metal sheet between the first supply element 4 and the second supply element 8, wherein the shielding 15 spatially separates the communication signal 9 and the measurement signal 5 during operation. In detail, this prevents the measurement signal 5 from leaving the container 10 during operation and the communication signal 9 from penetrating the container 10 during operation. In addition, the metal sheet is mechanically connected to the first supply element 4, which is designed as a waveguide.

Figure 6:
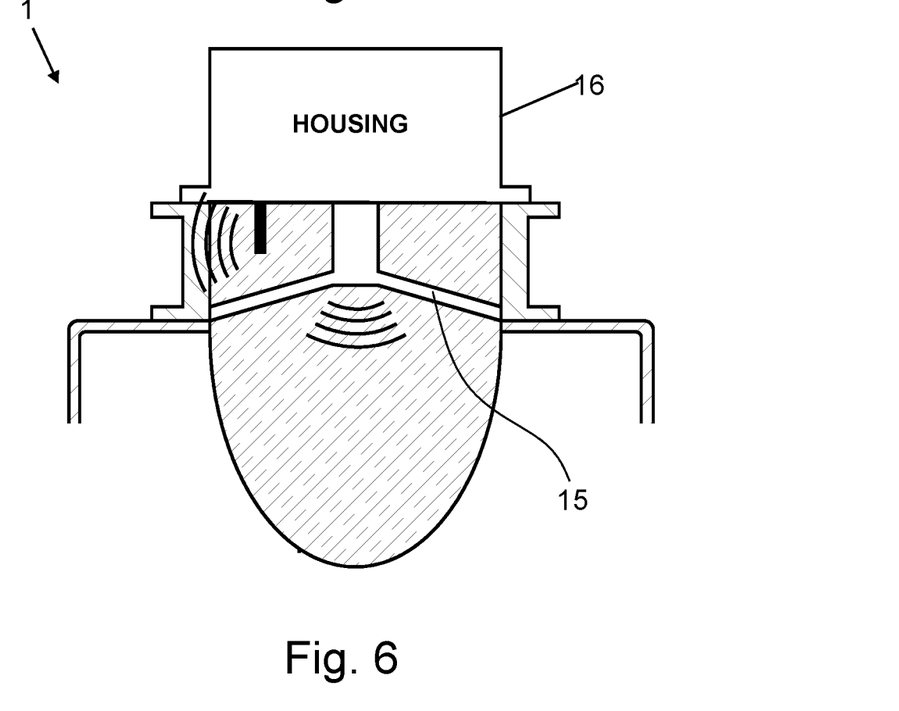

An alternative design of shielding 15 is shown in FIG. 6. According to this embodiment, the shielding 15 is a metal sheet which is arranged around the waveguide in the form of a truncated cone and is designed in one piece with the waveguide or is connected to the waveguide in a material-bonding manner.

Figure 7:
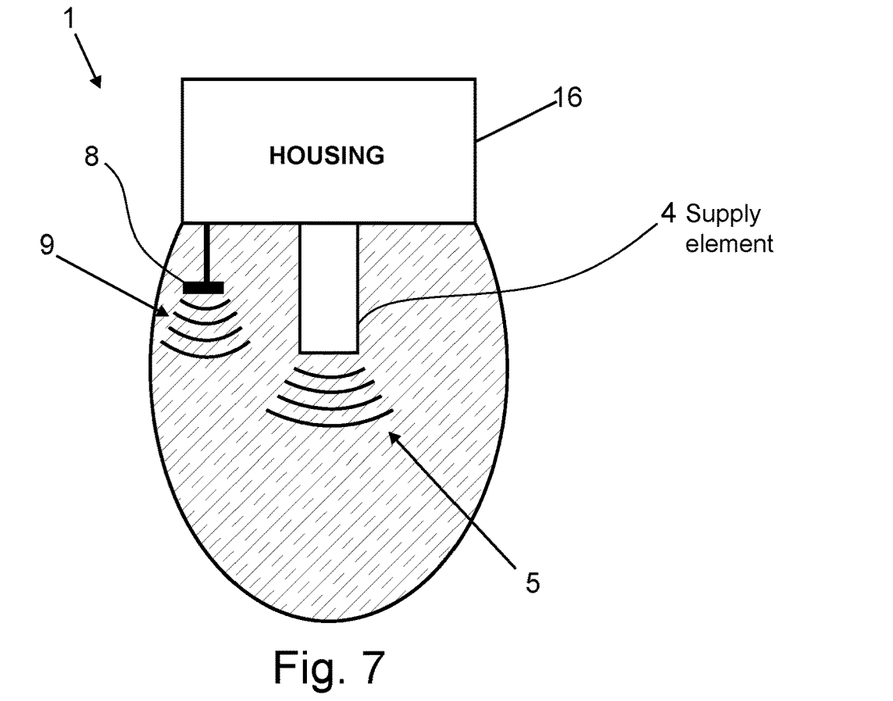

In contrast to the design examples shown above, the first supply element 4 and the second supply element 8 are arranged in the fill level measuring device 1 shown in FIG. 7 in such a way that the measurement signal 5 and the communication signal 9 are emitted essentially in the same direction. The illustrated embodiment is particularly suitable for use in open containers or in a containerless environment.

Figure 8:
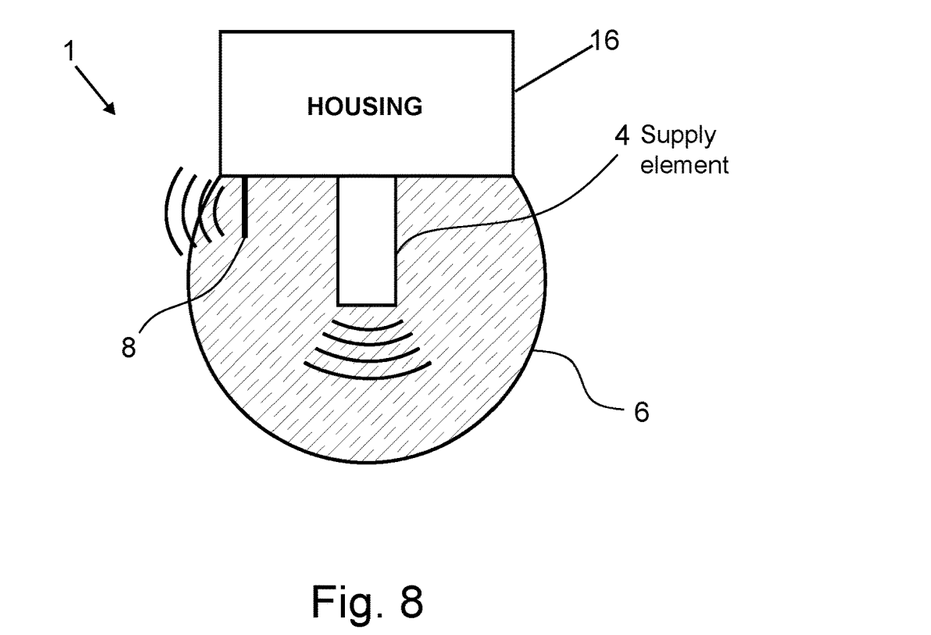

FIG. 8 shows a further embodiment of a fill level measuring device 1, wherein the measurement signals 5 and the communication signal 9 are radiated at an angle of approximately 90° relative to one another during operation. The length of the second supply element 8 is substantially, i.e., by at least a factor of 2, shorter than the length of the first supply element 4, which is designed as a waveguide. In this manner, mutual interference between the two signals 5 and 9 can be minimized In addition, the dielectric body 6 is spherical.

Figure 9:
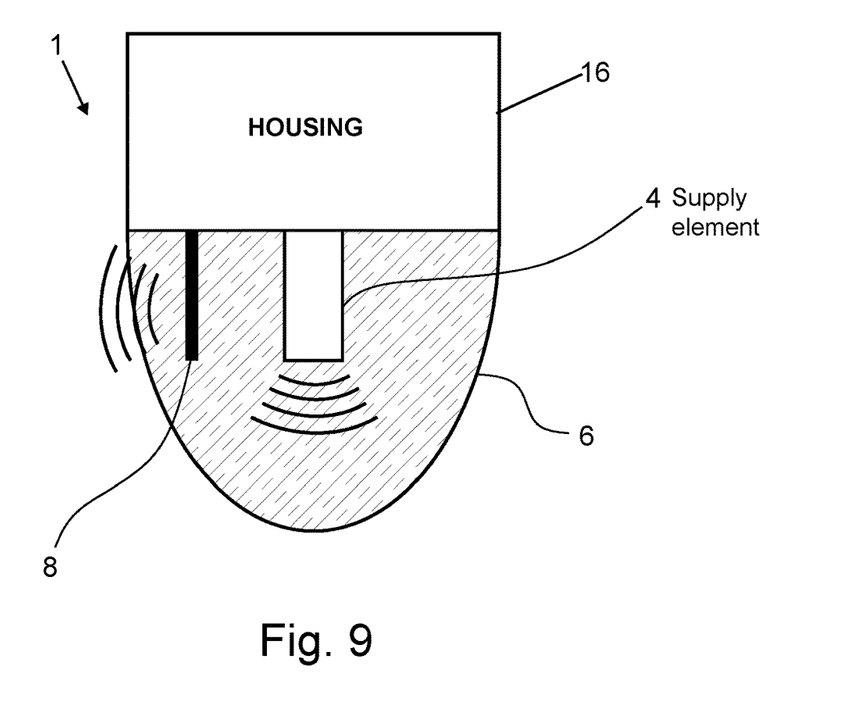

FIG. 9 shows another embodiment of a fill level measuring device, wherein the dielectric body 6 has the shape of a semi-ellipsoid.

Figure 10:
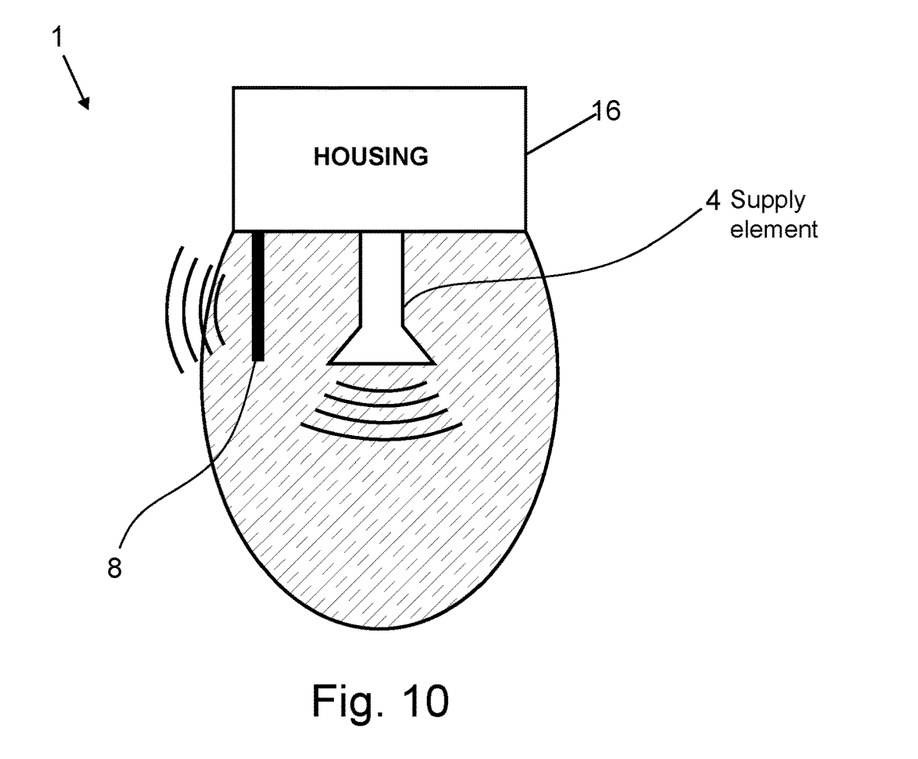

The embodiment of a fill level measuring device 1 shown in FIG. 10 comprises a first supply element 4 designed as a horn radiator.

Figure 11:
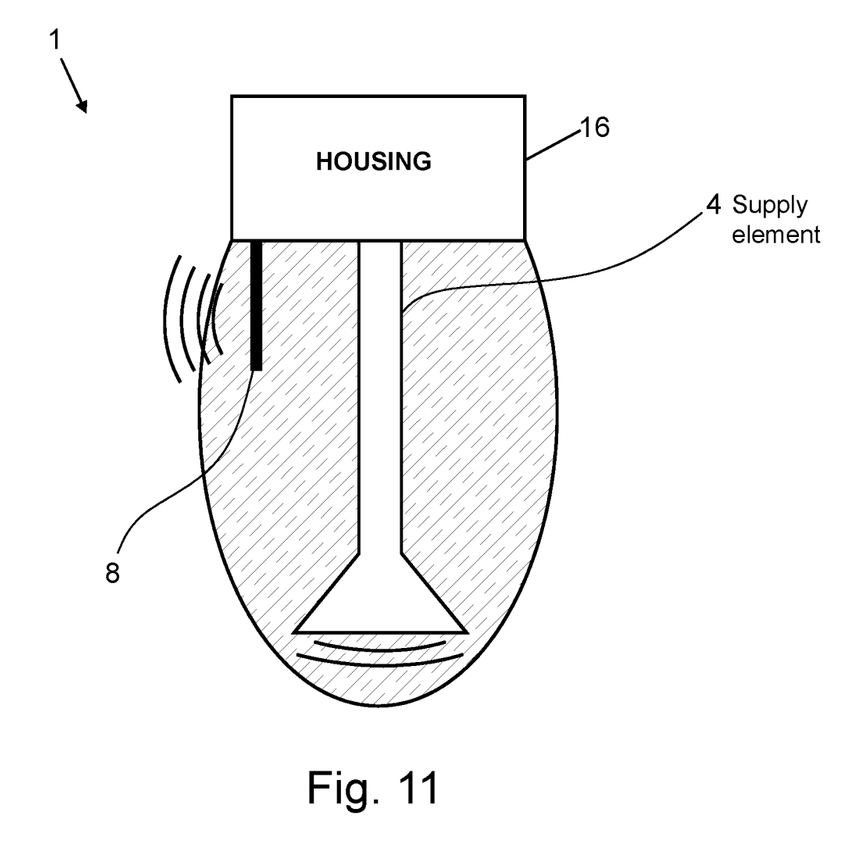

FIG. 11 shows another embodiment of a fill level measuring device 1, wherein the first supply element 4 is designed as a horn radiator and wherein the length of the horn radiator corresponds substantially to the length of the dielectric body 6. This design has the additional advantage that the communication signal 9 emitted by the second supply element 8 is shielded by the horn radiator, in particular due to the length and geometric design of the horn radiator, wherein mutual interference between the two signals 5 and 9 can be minimized.

What is claimed is:

1. Fill level measuring device, comprising:
   at least one transmitting and receiving unit comprising a measuring antenna with a first supply element for transmitting and receiving an electromagnetic measurement signal, at least one dielectric body for at least one of guiding or shaping waves of the measurement signal, and a communication antenna that has at least one second supply element for wireless transmission and for receiving an electromagnetic communication signal,
   wherein the first supply element and the second supply element are arranged inside the dielectric body so that the dielectric body at least one of guides or shapes the communication signal in addition to the measurement signal.

2. Fill level measuring device according to claim 1, wherein the second supply element is one of a rod, a glue-on antenna body or a foil antenna body.

3. Fill level measuring device according to claim 1, wherein the first supply element and the second supply element are arranged in such a way that the measurement signal and the communication signal are radiated in different directions.

4. Fill level measuring device according to claim 1, wherein the communication antenna comprises an electronic unit and wherein the electronic unit and the second supply element of the communication antenna are configured and arranged to emit the communication signal according to one of the following standards: Bluetooth, GPS, GSM, LTE, Zigbee, Z-Wave, wireless HART, wireless fieldbus standards, WLAN, 5G, UMTS, CDMA.

5. Fill level measuring device according to claim 1, wherein the fill level measuring device is configured and arranged relative to a container for measuring fill level within the container and wherein at least one mounting element is provided which arranges the second power supply element at least partially in an outer region of the container in a mounted state on the container.

6. Fill level measuring device according to claim 5, wherein the mounting element has at least one of a threading, a mounting flange or a tube-shaped spacer.

7. Fill level measuring device according to claim 1, further comprising a shielding that is configured and arranged in such a way that, during operation of the fill level measuring device, the shielding spatially separates the measurement signal emitted by the first supply element from the communication signal emitted by the second supply element.

8. Fill level measuring device according to claim 7, wherein the shielding comprises a metallic shielding element arranged inside the dielectric body.

9. Fill level measuring device according to claim 8, wherein at least one second communication antenna is provided as a connection between two networks with different structure or switching technology.

* * * * *